United States Patent Office 3,767,616
Patented Oct. 23, 1973

3,767,616
PROCESS FOR PRODUCING POLYAMIDOXIMES AND POLY(BISBENZIMIDAZOBENZOPHENAN-THROLINE) (BBB) TYPE POLYMERS DERIVED THEREFROM
Carl N. Zellner, New Hope, Pa., assignor to Celanese Corporation, New York, N.Y.
No Drawing. Filed Oct. 30, 1970, Ser. No. 85,749
Int. Cl. C08g 30/22
U.S. Cl. 260—47 R    24 Claims

ABSTRACT OF THE DISCLOSURE

Process for the preparation of BBB-type polymers which comprises reacting at temperatures of from about 0° to about 100° C. a carbonyl halide, e.g., phosgene, with an imidazole polymer for a period of time required to form the characteristics BBB type linkages. The imidazole polymer is preferably formed by the reaction of a sulfonyl halide with an amidoxime polymer at temperatures of from about 0° to about 90° C. The amidoxime polymer is preferably prepared by reaction of an aromatic diamine with a bis(hydroxamoyl halide) or a derivative thereof. Formation of the polyamidoxime is preferably conducted in the presence of a solvent, which may or may not also function as an acid-acceptor; if not, then preferably also in the presence of an acid-acceptor. The preferred acid-acceptors are those which are insoluble in the reaction mixture—most preferably melamine and benzoguanamine. In a preferred prior step, aromatic bis(hydroxamoyl halide) reactants are made by the reaction of dialkyl aromatic precursors with, e.g., nitrosyl halide. Reactive amine or hydroxamoyl halide terminal groups of the polyamidoximes or imidazole or BBB type polymers may be reacted with other compounds or polymers which contain groups reactive therewith in order to further extend the poymer chains. Novel polyamidoximes.

---

This invention relates to a novel process for the preparation of poly(aroylenebenzimidazoles) or, more particularly, to poly(bisbenzimidazobenzophenanthroline) (BBB) type polymers and to a preferred synthetic route to those polymers which utilizes polyamidoximes.

Polyamidoximes are useful as chelating agents for sequestering polyvalent metal ions in plating baths, polluted streams, etc. The polymers are also useful as catalyst carriers and as ion-exchange resins. The polymers may be formed into fibers, films, molded articles, etc. Instead of undergoing ring closure to form the BBB type polymers of this invention, the polyamidoximes may be hydrolyzed to high performance polyamides by reaction with, e.g., dilute hydrochloric acid, or their oxime groups may be hydrogenated under appropriate conditions to amine groups to form polyamines, which are also useful as chelating agents. The polyamines may be reacted with polyepoxides to form epoxy resins and molded articles, or they may be crosslinked with dicarboxylic acids to form polyamide resins of interesting and varied properties.

The BBB polymers of this invention generally are useful for applications where high performance polymers are required. For example, in aerospace applications where retention of strength at elevated temperatures and flame retardance are required, the BBB polymers of this invention are especially outstanding. Heretofore, Nomex® polyamide type resins have been used in coveralls, etc. worn by pilots and race car drivers to protect against injuries from fires resulting from crashes, etc. Unfortunately, Nomex® garments are not as non-flammable as desired. In addition, wearers of these garments have complained that they are clammy, especially when worn in a closed cockpit. BBB type polymers are much less flammable than Nomex® resins. Garments made from BBB type polymers are not clammy, especially when the fabric in the garment is woven from staple, which fabric has the feel of cotton.

Heretofore, BBB type polymers have been made by the reaction of diamobenzidine with a tetracarboxylic acid or a derivative thereof. Overall this process is undesirable because it is expensive and also because of toxicity problems. The diamobenzidine is difficult to synthesize and difficult to purify, thereby resulting in a very expensive starting material. This compound is also highly toxic. The other starting material is usually a tetracarboxynaphthalene, which is also relatively expensive because it is not, as of now, an article of commerce. Another drawback to the prior art process is that relatively high temperatures are required, e.g., temperatures in the range of about 390° C. or higher.

One or more of the foregoing and other adverse effects of the prior art process are overcome by the novel process of the present invention.

Generally, the process of the present invention comprises reacting a carbonyl halide, e.g., phosgene, with an imidazole polymer to form the BBB type polymers of this invention. The imidazole polymer may be prepared by reacting an aromatic tetramine with a dicarboxylic acid or diester compound. Preferably, the imidazole polymer is formed by subjecting a polyamidoxime to ring closing conditions. The ring closure may be conducted in the presence of a catalyst at temperatures of from about 0° to about 250° C. or by reaction with a sulfonyl halide at temperatures o from about 0° to about 90° C. The polyamidoximes may be made by reaction of an aromatic diamine with a bis(hydroxamoyl halide) or a derivative thereof at temperatures of from about 0° to about 250° C. The formation of the polyamidoxime is preferably conducted in the presence of a solvent, which may or may not also function as an acid-acceptor; if not, then preferably also in the presence of an acid-acceptor. The preferred acid-acceptors are those which are insoluble in the reaction mixture—most preferably melamine and benzoguanamine. In a preferred prior step, aromatic bis(hydroxamoyl halide) reactants are made by the reaction of dialkyl aromatic precursors with, e.g., nitrosyl halide.

Depending upon the route chosen to form the imidazole polymer an aromatic diamine or tetraamine may be used to form that precursor.

By the term "aromatic diamine" and "aromatic tetraamine" are meant compounds in which the amino groups are each attached to an aromatic ring, not necessarily all attached to the same ring, however. Generally, any aromatic diamine or tetraamine containing up to about 30 carbon atoms can be used in the present invention. Preferably, the diamine or tetraamine contains up to about 15 carbon atoms. The most preferred diamines are benzidine and oxydianiline. The most preferred tetraamine is diaminobenzidine.

The preferred route to the imidazole polymer precursor for the BBB type polymers of this invention involves the reaction of an aromatic diamine such as those described below with a bis(hydroxyamoyl halide), or a derivative thereof, also described below, to form an amidoxime polymer which is then subjected to ring closing conditions to form the imidazole polymer.

Illustrative of the aromatic diamines which may be used in the present invention are those which may be depicted by the following general formula:

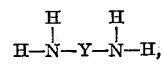

wherein Y is

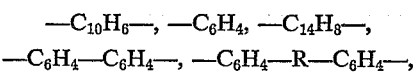

wherein R is as defined below, and the like. Y may be substituted with groups which do not detrimentally interfere with the reaction.

Illustrative subcategories of the diamines which may be used are:

(I) Compounds of the general formula $$H-\overset{H}{\underset{|}{N}}-Z-\overset{H}{\underset{|}{N}}-H$$

wherein Z is $-C_6H_4-$, $-C_{10}H_6-$, $-C_{14}H_8-$;

(II) Compounds of the general formula

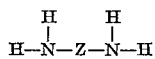

(III) Compounds of the general formula

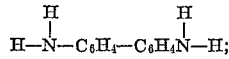

wherein R may be

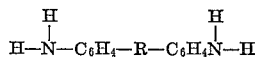

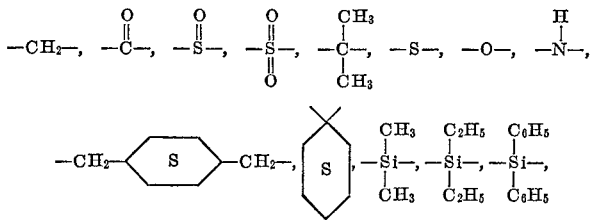

or the like.

Illustrative of particular aromatic diamines which may be used in the process of this invention are the following:

m-phenylene diamine
p-phenylene diamine
o-phenylene diamine
1,4-naphthalene diamine
1,5-naphthalene diamine
1,6-naphthalene diamine
1,7-naphthalene diamine
1,8-naphthalene diamine
2,3-naphthalene diamine
2,6-naphthalene diamine
2,7-naphthalene diamine
1,4-diamino-2-methyl-naphthalene
1,4-diamino-anthracene
2,6-diamino anthracene
9,10-diamino-anthracene
9,10-diamino-phenanthrene
2,2'-diamino-biphenyl
2,4'-diamino-biphenyl
3,3'-diamino-biphenyl
3,4'-diamino-biphenyl
4,4'-diamino-biphenyl
4,4'-diamino-2,2-dimethyl-biphenyl
1,1-bis(4-aminophenyl) cyclohexane
bis(4-aminophenyl)dimethyl silane
bis(4-aminophenyl) diethyl silane
bis(4-aminophenyl) diphenyl silane
bis(4-aminophenyl) amine
bis(4-aminophenyl) ether, i.e., 4,4'-diamino diphenyl ether
bis(4-aminophenyl) thioether
2,2-bis(4-aminophenyl) propane
bis(4-aminophenyl) sulfone
bis(4-aminophenyl) sulfoxide
bis(4-aminophenyl) ketone
bis(4-aminophenyl) methane Bis(hydroxyamoyl halides) which may be used in the preferred process of this invention are aromatic compounds and may be, e.g., the chlorides, bromides or iodides. The chlorides and bromides are generally preferred. The compounds are illustrated by the following formula:

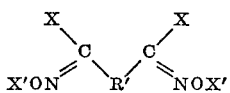

wherein X is halogen, or $-OR''$, $-SR''$ (R'' is alkyl of up to 4 carbon atoms), or $-OC_6H_5$; X' is hydrogen or an $-SO_2OK$, $-SO_2ONa$,

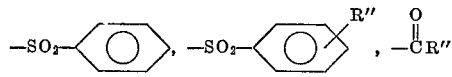

(R'' is alkyl of up to 4 carbon atoms),

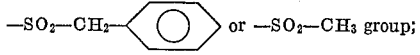 or $-SO_2-CH_3$ group;

and R' is a divalent aromatic radical unsubstituted in a position either ortho, meta or peri to each carbohydroxyamoyl halide group or its derivative

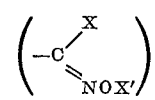

Illustrative of the aromatic groups represented by R' are

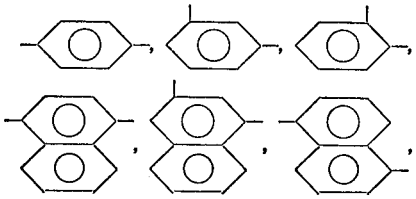

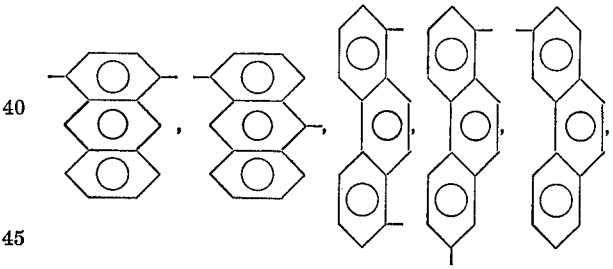

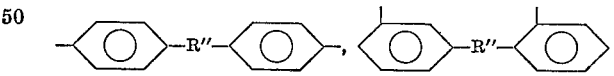

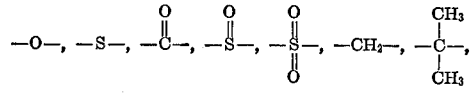

wherein R'' is

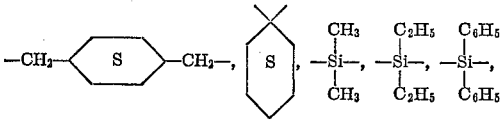

and the like. It is preferred that R' contain up to about 18 carbon atoms. R' is preferably a naphthylylene radical, i.e., $-C_{10}H_6-$, with the free valences in the 1,4- or 1,5-positions. R' may be substituted with other groups which do not detrimentally interfere with the reaction.

Illustrative of particular bis(hydroxamoyl halides) are the following:

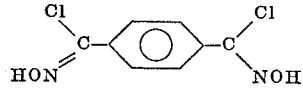

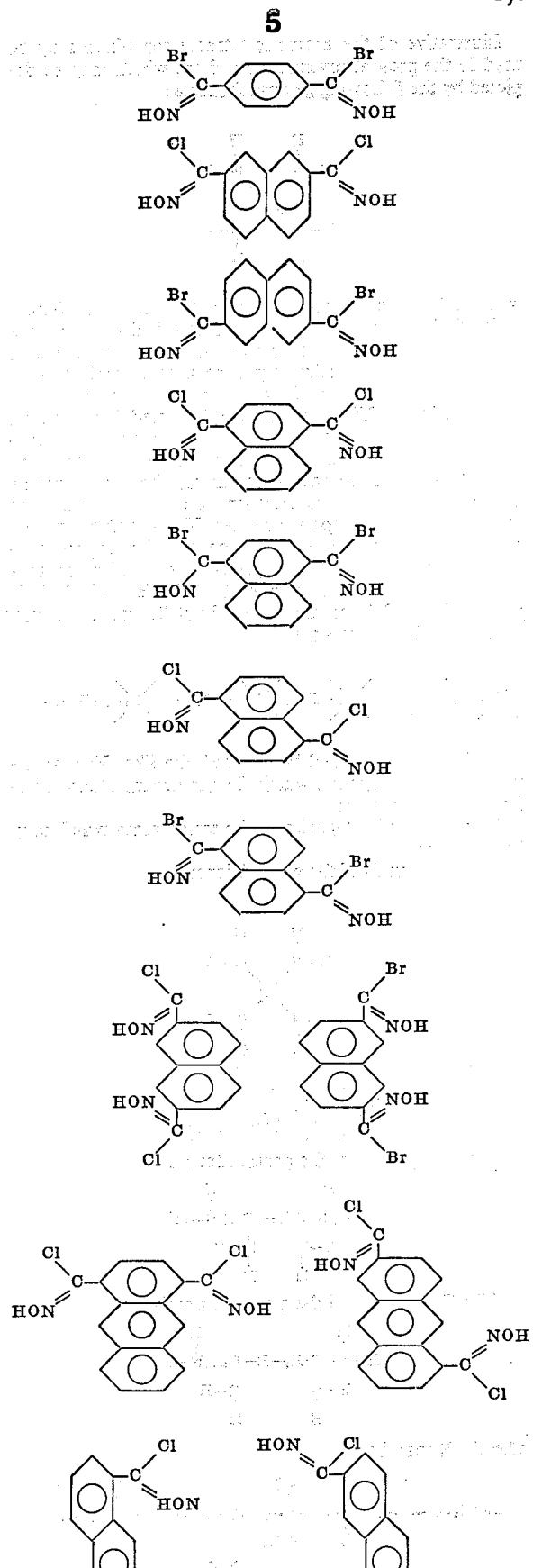

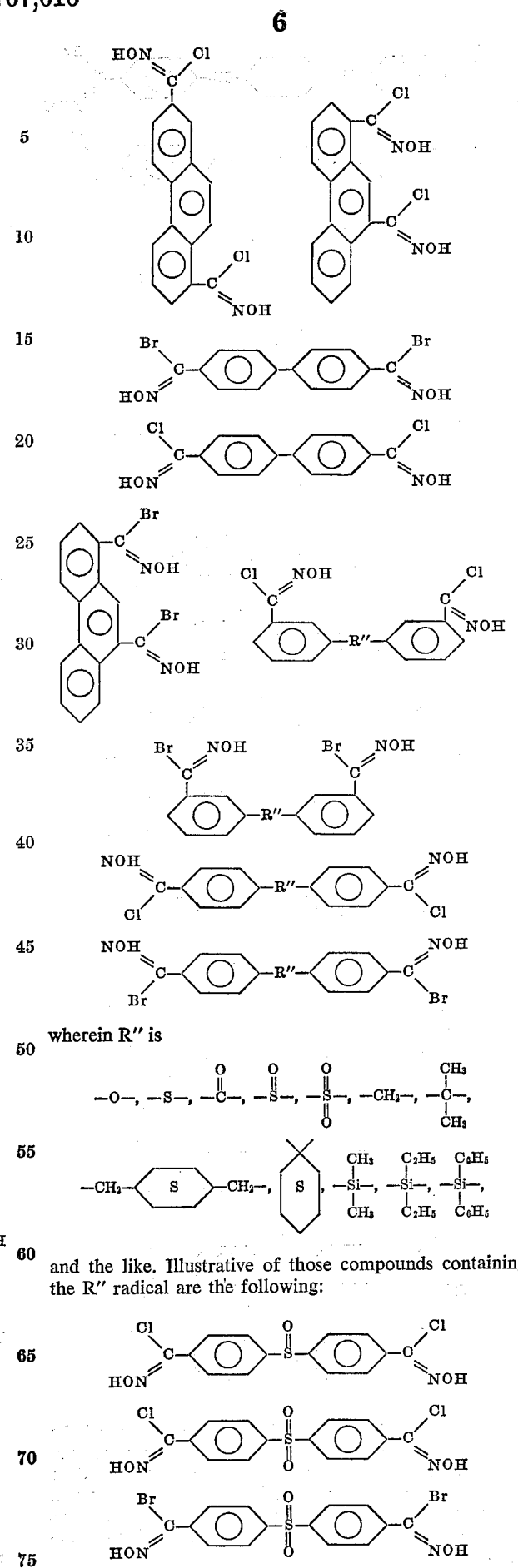

wherein R″ is $-O-$, $-S-$, $-\overset{O}{\underset{}{C}}-$, $-\overset{O}{\underset{}{S}}-$, $-\overset{O}{\underset{O}{S}}-$, $-CH_2-$, $-\overset{CH_3}{\underset{CH_3}{C}}-$, $-CH_2-\underset{S}{\bigcirc}-CH_2-$, $\underset{S}{\bigcirc}$, $-\overset{CH_3}{\underset{CH_3}{Si}}-$, $-\overset{C_2H_5}{\underset{C_2H_5}{Si}}-$, $-\overset{C_6H_5}{\underset{C_6H_5}{Si}}-$ and the like. Illustrative of those compounds containing the R″ radical are the following:

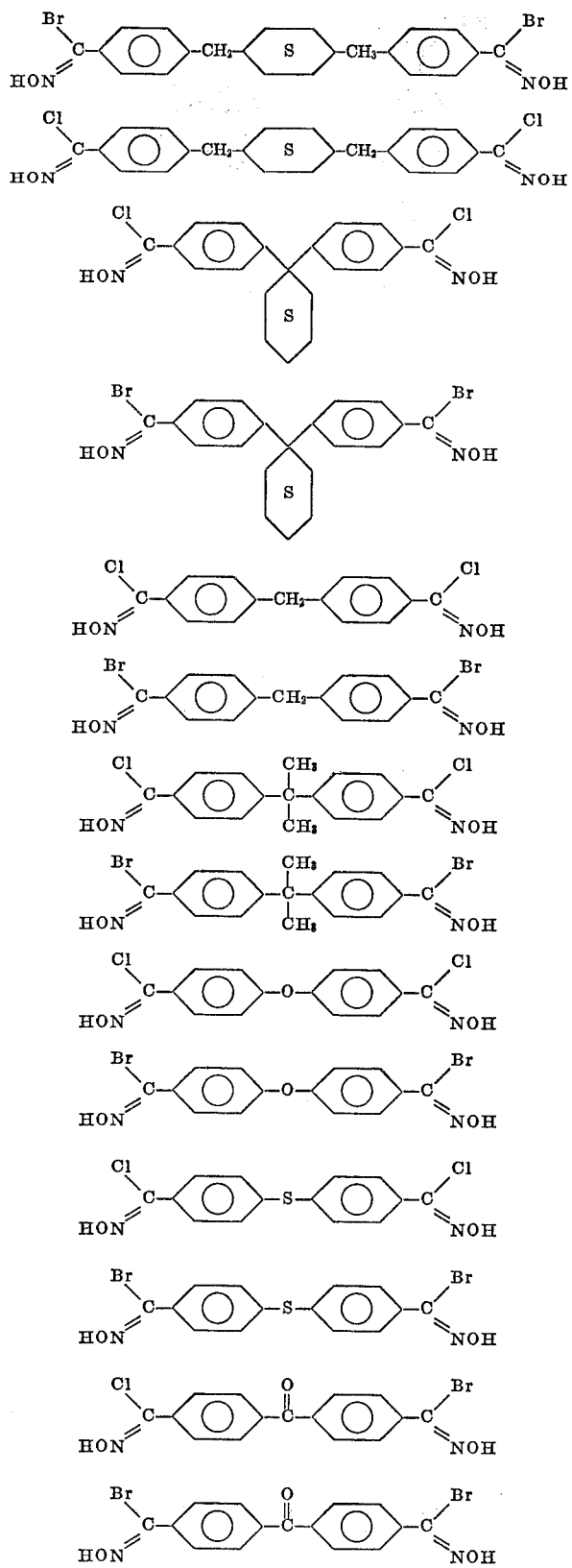

Illustrative of the aromatic tetraamines which may be used in the present invention are those which may be depicted by the following general formula:

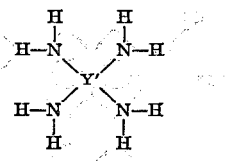

wherein Y' is an aromatic tetravalent radical and wherein each of the four amino groups is attached directly to a carbon atom present in a ring of said aromatic radical in a position which is ortho or peri to another carbon atom to which another of said amino groups is also directly attached. When Y' is an amino substituted bicyclic ring compound, such as a tetra-amino substituted naphthalene, the carbon atoms at the 1 and 8 positions are considered to be peri to each other as are the carbon atoms at the 4 and 5 positions. Five or six membered rings are formed depending upon whether Y' is ortho or peri amino substituted respectively, as will be apparent to those skilled in the art. It is preferred that Y' be an aromatic radical rather than a cycloaliphatic radical. It is preferred that Y' contain up to about 20 carbon atoms. Illustrative Y' radicals are

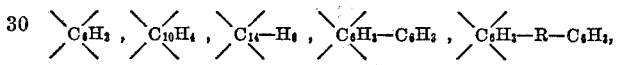

wherein R is as defined below, and the like, Y' may be substituted with groups which do not detrimentally interfere with the reaction.

Illustrative subcategories of the tetraamines which may be used are:

(I) Compounds of the general formula

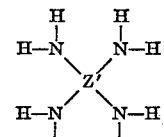

wherein Z' is

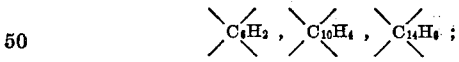

(II) Compounds of the general formula

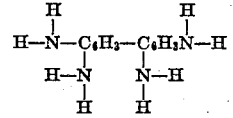

(III) Compounds of the general formula

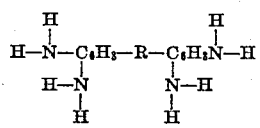

wherein R may be

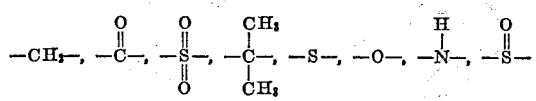

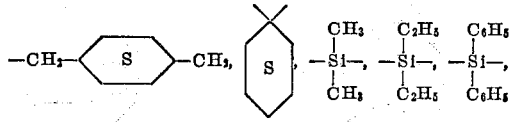

or the like.

In an alternative method for the preparation of the imidazole polymer precursors for this invention an aromatic tetraamine is reacted with a dicarboxylic acid or diester to form a polymer having amide linkages which is then subjected to ring closing conditions in accordance with the process of this invention to form imidazole linkages.

Non-limiting examples of the tetra-amine monomers which may be used individually or in mutual admixture in forming the desired polymers are:

3,3'-diaminobenzidine;
bis(3,4-diamino phenyl) methane;
1,2-bis(3,4-diamino phenyl) ethane;
2,2-bis(3,4-diamino phenyl) propane;
bis(3,4-diamino phenyl) ether;
bis(3,4-diamino phenyl) sulfide;
bis(3,4-diamino phenyl)sulfone;
1,2,4,5-tetra-amino benzene;
1,4,5,8-tetra-aminonaphthalene;
2,3,6,7-tetra-aminonaphthalene; etc.; and the like.

The aromatic dicarboxylic acids or their esters which may be reacted with the aromatic tetraamines are well known in the art. The compounds are illustrated by the following formula $$R'''OOC—R'—COOR'''$$

wherein $R_2$ is as described and illustrated above and $R'''$ is either hydrogen, an alkyl group of up to 4 carbon atoms or a phenyl group.

Illustrative of such compounds are the following:

o—benzenedicarboxylic acid
m—benzenedicarboxylic acid
p—benzenedicarboxylic acid; phthalic acid; isophthalic acid; terephthalic acid; and the like.

Generally, equimolar quantities of the monomers are used to form the polymers of this invention. However, it is possible to terminate the polymer chains with, e.g., either hydroxamoyl halide groups or amino groups merely by utilizing in the reaction an excess of the reactant containing either of those groups. To obtain relatively high intrinsic viscosity polymer, it is generally preferred that the excess not exceed about 5 mole percent.

When the polymer is terminated by hydroxamoyl halide or carboxy groups, they may be reacted with compounds or polymers containing at least one group, preferably two groups, which is (are) reactive therewith under the conditions of the reaction. Such groups may be, for example, amines or phenoxides.

When an excess of the amine monomer is used, the excess will function as an acid-acceptor. Excess amine may also function as chain-stoppers, or end-blocking units, the terminal amine groups of which may serve as reactive groups through which the chain may be further extended by reaction with other compounds containing at least one group, preferably two groups, which is (are) reactive with the amine groups under the reaction conditions. Such groups and compounds are, for example, hydroxamoyl halide; isocyanate; halogen, e.g., chlorine and bromine; epoxide; acid chlorides, e.g., adipoyl chloride; carboxy, e.g., adipic acid, tetracarboxy-naphthalene; amine (condensation reaction); $SO_2Cl_2$; phosgene (to form a urea linkage or to form isocyanate groups depending on reaction conditions, which latter groups may be converted to urethane linkages by reaction with polyols); hydrazine (to form semicarbazides); phosgenated diols [aliphatic or aromatic bis-chlorocarbonates (to form urethane linkages)].

Of course, it will be obvious to one skilled in the art that mixed polymers may be produced by polymerizing more than one of either or each of the two reactants in each of the alternative methods. These mixed polymers may be either random or alternating and may be formed from using mixtures of different species of either or both reactants, or they may be block polymers, which may be formed by reacting an amine-terminated polymer of relatively low molecular weight with a hydroxamoyl halide or carboxy terminated polymer of relatively low molecular weight which has itself been formed from monomers which are different from those used to form the first polymer. The relatively low molecular weight polymers may instead be substantially the same except for one being amine-terminated and the other hydroxamoyl halide or carboxy terminated, and possibly differences in molecular weight and configuration.

Cyclization of the polyamidoxime polymers may be accomplished before or after linking in the manner just described. If cyclization is to be performed before linking, the terminal amino groups may need protection, e.g., by acetylation, before cyclization is conducted. After cyclization, the protected groups are reconverted to amine groups by hydrolysis, before linking.

Although the two monomers in each of the alternative methods could be directly contacted together, especially when one or both are liquids or when the reaction temperature is high enough to melt one or both, it is preferable to conduct the reaction in the presence of a solvent. The solvent may be inert or may function as an acid-acceptor to remove the by-product hydrogen halide formed during the reaction, when necessary.

Illustrative of the inert solvents which may be used are $N_2O_4$; acetonitrile; nitrated solvents, e.g., nitromethane and nitrobenzene; chlorinated solvents, e.g., methylene chloride, chloroform, carbon tetrachloride, ethylene chloride, and chlorobenzene; the ethers, e.g., tetrahydrofurane, diethyl ether, and dioxane; the esters, e.g., amyl acetate; the lactones, e.g., butyrolactone; ketones, e.g., cyclopentanone, cyclohexanone; acetic acid; polyphosphoric acid and cresols. Cyclohexanone and polyphosphoric acid are preferred.

If an inert solvent has been used in the preferred method, it is desirable to add to the mixture an acid-acceptor such as a tertiary amine, e.g., trialkylamines such as trimethylamine, triethylamine, and the like; triethylene diamine; 1,3 dimethylamino butane; heterocyclic amines such as pyridine, picolines, lutidines; or an alkali metal or alkaline earth metal hydroxide, bicarbonate, carbonate, or alkanoate (up to 4 carbon atoms), e.g., sodium hydroxide, sodium carbonate, sodium bicarbonate, potassium acetate, etc.

Particularly useful acid-acceptors are those insoluble in the reaction mixture, e.g., melamine, benzoguanamine, dicyanamide, insoluble guanidine derivatives, insoluble basic ion-exchange resins. Preferred are melamine and benzoguanamine. Of course, mixtures of the acid-acceptors may be used. The afore-mentioned acid-acceptors may be used in conjunction with the following solvents which also function as acid-acceptors.

Illustrative of the solvents which also function as acid-acceptors are dimethylacetamide (DMAc), dimethylformamide (DMF), pyrrolidone, and its alkylated derivatives, e.g., N - methyl - pyrrolidone, dimethyl sulfoxide (DMSO), hexamethylphosphoramide, dialkylanilines, dimethylaniline and diethylaniline, and the like. DMAc is preferred.

In place of a single solvent in the reaction mixture, there may be used mixed solvent systems containing either or both types of solvents.

In order to avoid undesirable side reactions in the preferred method, it is preferable to use either an acid-acceptor which is insoluble in the reaction mixture, preferably melamine, or to use a soluble amine but ensure that its instantaneous concentration in the reaction mixture is relatively low, e.g., lower than 0.01 molar concentration—for example, by slowly and continuously adding the acid-acceptor or by incrementally adding small portions.

The reaction of the bis(hydroxamoyl halide)-with the aromatic diamine is generally exothermic and may be conducted at autogenous temperature, or it may be conducted at a constant temperature by the application of the required cooling or heating conditions. The reaction may be conducted at temperatures of from about 0° to about 250° C., preferably about 0° to about 100° C.

The reaction of the tetraamine with the dicarboxylic acid or its diester may be conducted at autogenous temperature, or it may be conducted at a constant temperature by the application of the required cooling or heating conditions. The reaction may be conducted at temperatures of from about 80° to about 300° C., preferably about 100° to 200° C. If an excessive reaction temperature is used, a product which is difficult or impossible to shape may be obtained. But the permissible upper temperature limit will vary depending upon the reactants selected, the polymerization medium used, the mutual proportions of the reactants, their concentration in the polymerization medium, and the minimum time that one desires for the reaction. The particular polymerization temperature that should not be exceeded if a particular system is desired to provide a reaction product composed of a shapable polymer will accordingly vary from system to system but can be determined for any given system by a simple test by any person of ordinary skill in the art.

Both the reaction temperature and the reaction period used significantly affect the degree of polymerization. Generally, reaction periods can range from about 0.5 to 100 hours at the above-mentioned reaction temperatures. Higher reaction temperatures tend to result in polymer products having a higher inherent viscosity than polymers produced at lower temperatures and at comparable reaction periods.

It is preferred that the molecular weight of the polymer formed be such that its inherent viscosity is at least 0.3 (e.g. 0.5 to 5.0), and most preferably about 2.5 to 2.8. The inherent viscosity is measured at 25° C. at a concentration of 0.4 g. of polymer per 100 ml. of solvent. Ninety-seven percent sulfuric acid (by weight) is a convenient and preferred solvent for the purpose of this invention though other solvents may be used similarly. The viscosity of the polymer solution is measured relative to that of the solvent alone and the inherent viscosity (I.V.) is determined from the following equation:

$$I.V. = \frac{\ln \frac{V_2}{V_1}}{C}$$

In the above formula, $V_2$ is the efflux time of the solution, $V_1$ is the efflux time of the solvent, and C is the concentration expressed in grams of polymer per 100 ml. of solution. As is known in the polymer art, inherent viscosity is monotonically related to the molecular weight of the polymer.

In the preferred route the closing of the ring to actually form the imidazole polymers may be accomplished by the appropriate thermal conditions, e.g., by heating the amidoxime polymer to a temperature in the range of about 0° to 250° C., preferably in the presence of a catalyst, especially an acidic catalyst such as silica gel, silica-alumina, sulfonated polystyrene ion-exchange resins, and polyphosphoric acid. Polyphosphoric acid is the preferred catalyst.

Ring closure may also be accomplished by the reaction of the amidoxime polymer with sulfonyl halide, such as benzene sulfonyl chloride, naphthalene sulfonyl chloride, toluene sulfonyl chloride, methane sulfonyl chloride, or other ring closing reagents under appropriate condition, e.g., about 0° C. to about 90° C. or higher, preferably about 5° C. The aromatic sulfonyl halides are preferred, especially toluene sulfonyl chloride.

The aromatic diamines and tetraamines are either readily available or easily prepared by methods which are well-known to those skilled in the art. For example, benzidine may be prepared by the palladium-catalyzed hydrogenation in alkaline medium of nitrobenzene to form hydrazobenzene, which is then rearranged in the presence of, e.g., hydrochloric acid to form the desired product.

The bis(hydroxamoyl halides) used in the novel process of this invention, may be prepared by any of the routes which suggest themselves to one skilled in the art. For example, it is known that aldehyde groups in an appropriate aliphatic or aromatic dialdehyde may be reacted with hydroxylamine to form the corresponding bisoxime, which in turn may be reacted with halogen to form the bis(hydroxamoyl halide). Another method of preparing the bis(hydroxamoyl halides) is to start with the appropriate dialkyl aromatic precursor and react it with nitrosyl halide, preefrably in the presence of additional halogen, to form the bis(hydroxamoyl halide). Other reagents which may be used in place of the nitrosyl halide per se are a combination of nitric acid and hydrohalic acid, or a combination of nitric oxide (NO) and halogen.

The dialkyl aromatic precursors are either known compounds or may be prepared by any convenient method known to those skilled in organic synthesis. The precursors may generally be prepared by Diels-Alder synthesis either alone or together with other readily apparent synthetic steps. The Diels-Alder synthesis is generally based on readily available starting materials and their simpler Diels-Alder adducts. The following illustrative synthesis sequences show the preparation of one preferred precursor:

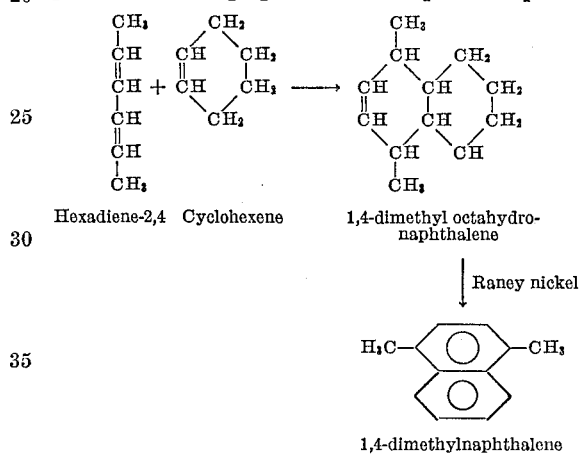

Hexadiene-2,4  Cyclohexene    1,4-dimethyl octahydro-
                               naphthalene

| Raney nickel 1,4-dimethylnaphthalene

The reaction of an appropriate dialkyl aromatic precursor with nitrosyl halide or any one of its aforementioned alternatives, is the preferred method for the preparation of the bis(hydroxamoyl halides). For example,

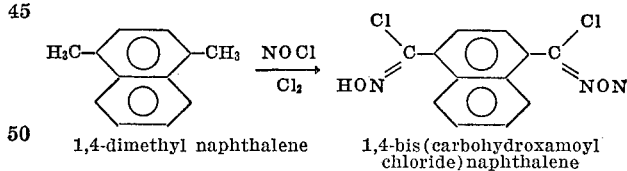

1,4-dimethyl naphthalene     1,4-bis(carbohydroxamoyl
                              chloride)naphthalene Instead of the aromatic reactant used in the above illustration, one may use an aromatic reactant corresponding to the desired aromatic bis(hydroxamoyl halides) described above. This preferred step in combination with the basic process of this invention, i.e., the reaction of the bis(hydroxamoyl halide) with an aromatic diamine results in a relatively simple, easy, relatively inexpensive, over-all process for the preparation of polyamidoximes from readily available starting materials. These polyamidoximes may be converted to BBB type polymers by a ring closure reaction.

The preferred process for the preparation of bis(hydroxamoyl halide) may be conducted at temperatures of from about −10° C. or lower to about 50° C. or higher. The reaction may be conducted at pressures in the range of an atmosphere or more, e.g., up to about 10 atmospheres, preferably from about one to about 5 atmospheres. In view of the corrosive nature of some of the reactants and products, such as nitrosyl halide, it is preferred to conduct the reaction in a reactor fabricated from a material which is inert under the reaction conditions, for example, a glass-lined reactor or one fabricated from titanium or nickel.

To enable the reader to more easily visualize the steps of the invention, the following schemata are set forth, using illustrative reactants.

It will be readily apparent to the reader, however, that the other reactants mentioned throughout the specification and claims may be used in their stead.

The products in A or B can be reacted with aromatic diamines to give amidoxime —O—sulfonate polymers which can then be converted to BBB type polymers in manners analogous to those illustrated above wherein bis (hydroxamoyl halides) have been exemplified as the starting materials.

PREPARATION OF AMIDOXIME POLYMER FROM BIS (HYDROXAMOYL CHLORIDE)

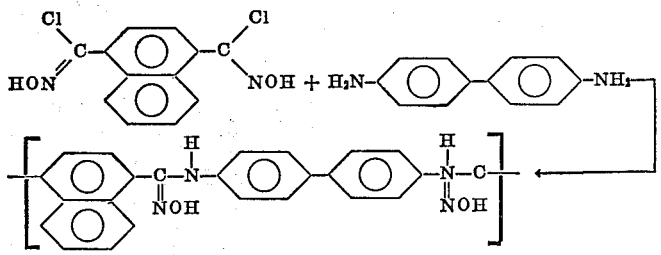

It is possible that a bis (hydroxamoyl halide) may decompose in the presence of certain acid-acceptors in accordance with the following illustrative reaction:

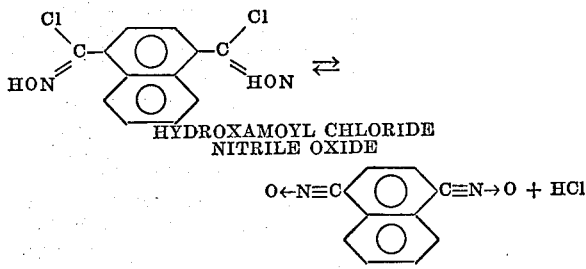

In order to inhibit or eliminate this side reaction, other alternative reactants may be used in place of this bis (hydroxamoyl halide) in the reaction to form amidoxime polymers, e.g., the O-sulfonate derivatives, which may be formed in accordance with the following illustrative schemes.

PREPARATION OF O-SULFONATES OF (BIS) HYDROXAMOYL CHLORIDES

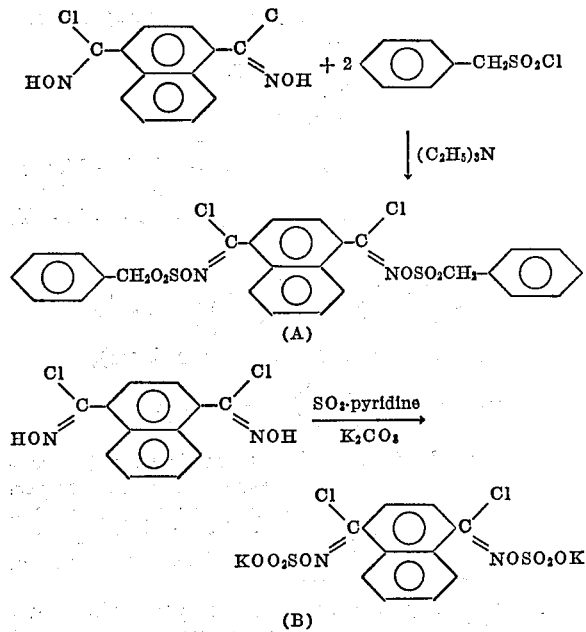

PREPARATION OF IMIDAZOLE POLYMER FROM AMIDOXIME POLYMER

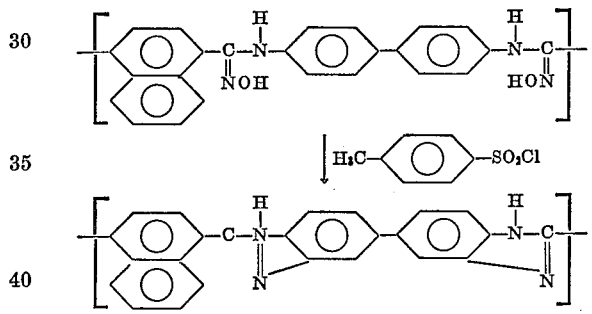

ALTERNATIVE PREPARATION OF IMIDAZOLE POLYMER

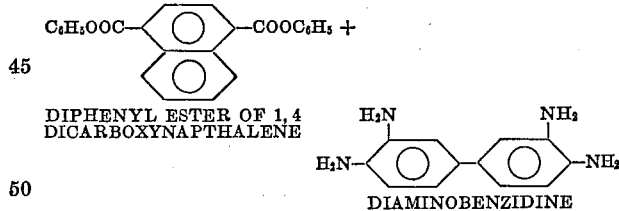

PREPARATION OF BBB FROM IMIDAZOLE POLYMER

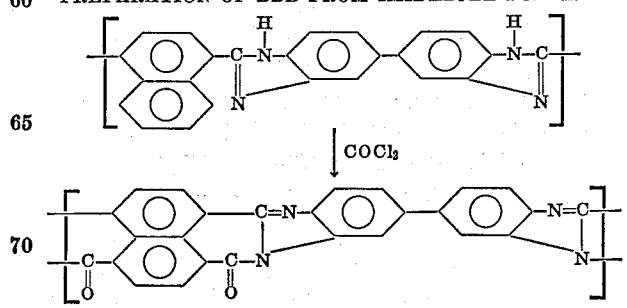

In the foregoing preparation of the BBB type polymer from an imidazole polymer, a temperature of from about

15

0° C. to about 100° C. preferably about 0° to about 50° C., may be employed. Suitable solvents for the reaction may be selected from those listed above and others which readily suggest themselves to one skilled in the art. For example, one may use anhdyrous benzene and initially cool the reaction mixture, then employ room temperature and subsequently elevate that if desired.

Example 1

A weight of 36.8 grams (0.10 mole) of the diphenyl ester of 1,4-dicarboxynaphthalene is placed in a stirred reaction vessel and blanketed with nitrogen. To this are added 21.4 grams (0.10 mole) of 3,3'-diaminobenzidine. The mixture is heated gradually to 285° C. under nitrogen, while continuing efficient stirring to break up the foam caused by evolution of phenol and water. After two hours the system is allowed to cool and the mass of foamed prepolymer is pulverized in a Wiley mill. The finely divided prepolymer is then heated under nitrogen in a small flask and is maintained at 390° C. for four hours as the nitrogen sweep removes traces of phenol and water. The polynaphthimidazole is a light tan powder with an intrinsic viscosity somewhat under 0.8 in $H_2SO_4$.

The polynaphthimidazole is added to 10 times its weight of dimethylacetamide to which 5% by weight of LiCl is added. This mixture is heated to 230° C. in a pressure vessel and then cooled. In a separate vessel an ice-cooled solution of 24.8 grams (0.25 mole) of phosgene in 5 times its weight of dimethylacetamide is made up. The polynaphthimidazole in dimethylacetamide is added slowly to the phosgene solution with stirring, while maintaining the temperature at 15° C. After stirring for one hour, a weight of 29.3 grams (0.22 mole) of anhydrous aluminum chloride is added and the mixture is held at 15° C. and kept at this temperature for 4 hours to effect ring closure to BBB. The polymer is isolated by precipitating in a large volume of cold water, filtering, washing with hot aqueous sodium hydroxide, water and alcohol, and drying.

Example 2

A polynaphthimidazole is prepared according to the procedure in Example I, except that 36.8 grams (0.10 mole) of 1,5 dicarboxynaphthalene diphenyl ester are used in place of the 1,4-dicarboxynaphthalene ester. The resulting polymer is dissolved in conc. sulfuric acid and the solution is poured into ice water to precipitate the polymer in finely divided form. After washing and drying, the fine powder is suspended in 400 mls. of anhydrous nitrobenzene, heated to reflux and cooled. A solution of 24.8 grams (0.25 mole) of phosgene in 200 mls. anhydrous nitrobenzene is added to the polymer in nitrobenzene and the mixture is cooled to 15° C. A weight of 25.3 grams (0.25 mole) of triethylamine is added with stirring over the course of 30 minutes and the reaction mixture is allowed to warm to room temperature while stirring for 7 hours. A weight of 57.3 grams (0.22 mole) of stannic chloride is added slowly, and the mixture is stirred for another 4 hours at room temperature. The nitrobenzene is distilled off under vacuo and the BBB polymer is washed thoroughly with ether, and with aqueous hydrochloric acid, water, alcohol and ether.

Example 3

A mixture of nitrosyl chloride and chlorine is generated from concentrated nitric and hydrochloric acids:

$$HNO_3 + 3HCl \rightarrow NOCl + Cl_2 + 2H_2O$$

The NOCl and $Cl_2$ are passed in a slow stream into a glass reaction flask containing 31.2 grams (0.20 mole) of 1,4-dimethyl naphthalene dissolved in 200 mls. of carbon tetrachloride. The reaction mixture is kept at 10°–15° C. while irradiating with a UV lamp. After 3 hours the mixture is filtered to remove insoluble products, from which can be isolated, by recrystallization from chloroform, naphthelene - 1,4 - bis(carbohydroxamoyl chloride). Byproducts may be recycled to the next run.

A weight of 14.15 grams (0.05 mole) of naphthalene-1,4-bis(carbohydroxamoyl chloride) is added to 500 mls. of dry DMAc. To this are added 9.21 grams (0.05 mole) of benzidine. While stirring at room temperature, a weight of 1.26 grams (0.10 mole) of melamine is added in small portions over the course of an hour. The mixture is allowed to stir another 3 hours. The polyamidoxime may be isolated at this point or it may be subjected to ring closure conditions in situ by adding 19.1 grams (0.10 mole) of toluene sulfonyl chloride and 15.8 grams (0.20 mole) of pyridine to the mixture maintained at 0° C. The mixture is allowed to stand overnight at 0°–5° C. The polynaphthimidazole is isolated by pouring the mixture into water, washing and drying.

A weight of 3.58 grams (0.01 equiv.) of polynaphthimidazole is added to 100 mls. dry DMAc and 5 grams LiCl, and heated to 230° C. in an autoclave and cooled. This is mixed with a solution of 2.48 grams (0.025 mole) of phosgene in 100 mls. dry DMAc. A weight of 2.53 grams (0.025 mole) of triethylamine is introduced slowly. The suspension is stirred for 7 hours at room temperature. A weight of 3.55 grams (0.025 mole) of boron trifluoride etherate is now added and stirring is continued for another 4 hours. The BBB is washed with hot water, alcohol and ether, and is dried under nitrogen.

Example 4

A polynaphthamidoxime is prepared as described in Example 3, except that 4,4'-diaminodiphenylether is used in place of benzidine. Ring closure of the polyamidoxime to the polynaphthimidazole is carried out in the same manner with toluene sulfonyl chloride and pyridine. Suspension of this polymer in 10 times its weight of dry DMAc and reaction with a 25% excess of phosgene and triethylamine as HCl acceptor introduces the —COCl group into the imidazole rings. A Friedel-Crafts catalyst, such as stannic chloride in 10% excess, causes reaction on the para position of the naphthalene rings with elimination of HCl and formation of the BBB-type structure.

In place of the use of Friedel-Crafts catalysts to form the BBB structure, one may accomplish this closure by heat alone at temperatures in the range of 200° to 400° C.

What is claimed is:

1. A process for the preparation of polymers having bisbenzimidazobenzophenanthroline linkages which comprises:

(I) reacting:

(A) an aromatic diamine with
   (B) a bis(hydroxamoyl halide) having the following formula:

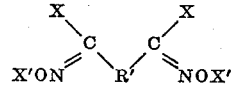

wherein X is halogen or —$OC_6H_5$—OR" or SR" (R" being alkyl containing up to 4 carbon atoms); X' is hydrogen or an —$SO_2OK$, —$SO_2ONa$,

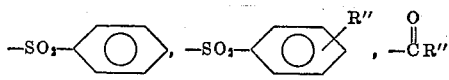

(R" is alkyl of up to 4 carbon atoms),

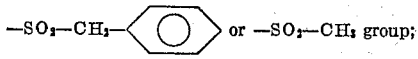

and R' is a divalent aromatic radical unsubstituted in a position either ortho, meta or peri to each carbohydroxamoyl halide group, at a temperature of from about 0° to about 250° for a period of time sufficient to form an amidoxime polymer;

(II) contacting said amidoxime polymer with a sulfonyl halide selected from the group consisting of benzene sulfonyl chloride, naphthylene sulfonyl chloride, toluene sulfonyl chloride, and methane sulfonyl chloride at a temperature of about 0° C. to about 90° C. for a period of time sufficient to convert at least some of the amidoxine groups to imidazole groups; and (III) reacting said imidazole containing polymer with phosgene at a temperature of from about 0° to about 100° C. for a period of time sufficient to form bisbenzimidazophenanthroline type linkages.

2. The process of claim 1 wherein said aromatic diamine and said bis(hydroxamoyl halide) are reacted at a temperature of from about 0° C. to about 100° C.

3. The process of claim 1 wherein X is bromine or chlorine.

4. The process of claim 3 wherein $R^1$ is a divalent aromatic group containing up to 18 carbon atoms.

5. The process of claim 4 wherein $R^1$ contains 10 carbon atoms.

6. The process of claim 1 wherein the aromatic diamine has the formula:

$$H-\overset{H}{\underset{}{N}}-Y-\overset{H}{\underset{}{N}}-H$$

wherein Y is $-C_6H_4-$, $-C_{10}H_6-$, $-C_{14}H_8-$, $-C_6H_4-C_6H_4-$, $-C_6H_4-R-C_6H_4-$, wherein R is

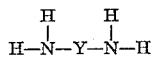
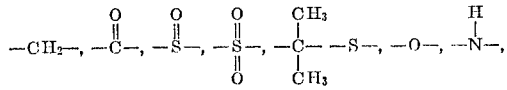
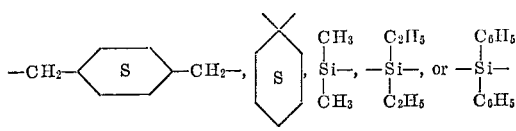

7. The process of claim 1 wherein the aromatic diamine contains up to about 30 carbon atoms.

8. The process of claim 7 wherein the aromatic diamine contains up to about 20 carbon atoms.

9. The process of claim 8 wherein the aromatic diamine is benzidine or oxydianiline.

10. The process of claim 1 wherein acid-acceptor is present during the reaction in Step I.

11. The process of claim 10 wherein the acid-acceptor is melamine, dicyanamide or benzoguanamine.

12. The process of claim 1 wherein there is present during the reaction in Step I a solvent selected from the group consisting of acetonitrile, nitromethane, nitrobenzene, methylene chloride, chloroform, carbon tetrachloride, $N_2O_4$, ethylene chloride, chlorobenzene, tetrahydrofurane, diethyl ether, dioxane, amyl acetate, butyrolactone, cyclopentanone, cyclohexanone, acetic acid, polyphosphoric acid and cresols.

13. The process of claim 12 wherein the solvent is cyclohexanone.

14. The process of claim 1 wherein there is present during the reaction in Step I a solvent which also functions as an acid-acceptor selected from the group consisting of dimethylacetamide, dimethylformamide, pyrrolidone, N-methylpyrrolidone, dimethyl sulfoxide, hexamethylphosphoramide, and N,N-dimethylaniline.

15. The process of claim 1 wherein the bis(hydroxamoyl halide) is prepared by reacting a dialkyl aromatic compound with nitrosyl halide for a period of time sufficient to form the product.

16. The process of claim 15 wherein the nitrosyl halide is nitrosyl chloride or nitrosyl bromide.

17. The process of claim 15 wherein the temperature of the reaction is from about —10° C. to about 50° C.

18. The process of claim 1 wherein the temperature in Step III is from about 0° C. to about 50° C.

19. The process of claim 1 Step III wherein there is present in the reaction an inert solvent or an acid-acceptor solvent or a mixture thereof.

20. The process of claim 19 wherein the solvent is anhydrous benzene.

21. A process, which comprises:
(A) preparing an imidazole polymer by reacting an organic tetramine having the formula

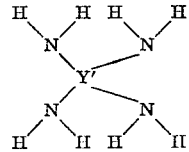

wherein Y' is $$\overset{}{\underset{}{>}}C_{10}H_4,\ \overset{}{\underset{}{>}}C_6H_2,\ \overset{}{\underset{}{>}}C_{14}H_6,\ \overset{}{\underset{}{>}}C_6H_3-C_6H_3,\ \text{or}\ \overset{}{\underset{}{>}}C_6H_3-R-C_6H_3$$

wherein R is selected from $$-CH_2-,\ -\overset{O}{\underset{}{C}}-,\ -\overset{O}{\underset{}{S}}-S,\ \overset{O}{\underset{O}{S}}-,\ -\overset{CH_3}{\underset{CH_3}{C}}-,\ -S-,\ -O-\overset{H}{\underset{}{N}}-,$$

$$-CH_2-\langle S \rangle-CH_2-,\ \langle S \rangle,\ -\overset{CH_3}{\underset{CH_3}{Si}}-,\ -\overset{C_2H_5}{\underset{C_2H_5}{Si}}-,\ \text{or}\ -\overset{C_6H_5}{\underset{C_2H_5}{Si}}-$$

with an aromatic dicarboxylic acid or a diester thereof at a temperature of from about 80° C. to 300° C. for a period of time sufficient to form a polymer containing imidazole linkages; and (B) reacting said polymer with phosgene at a temperature of from about 0° C. to about 100° C. for a period of time sufficient to form bisbenzimidazophenanthroline linkages.

22. The process of claim 21 wherein the temperature in Step B is from about 0° C. to about 50° C.

23. The process of claim 21 wherein there is present in Step B an inert solvent or an acid-acceptor solvent or a mixture thereof.

24. The process of claim 23 wherein the solvent is anhydrous benzene.

References Cited
UNITED STATES PATENTS 3,503,906   3/1970   Brack _____ 260—25
3,560,438   2/1971   Burton et al. _____ 260—47

WILLIAM H. SHORT, Primary Examiner

L. L. LEE, Assistant Examiner

U.S. Cl. X.R.

260—2 R, 2 S, 30.2, 30.6 R, 30.8 DS, 31.2 N, 32.4, 32.6 N, 32.8 N, 33.2 R, 47 CP, 49, 65, 78.4 R, 79.3 R, 448.2 B, 448.2 N, 453 R, 456 A, 566 D